United States Patent
Straehle (10) Patent No.: US 11,686,651 B2
(45) Date of Patent: Jun. 27, 2023

(54) METHOD AND DEVICE FOR DETECTING ANOMALIES IN TECHNICAL SYSTEMS

(71) Applicant: Robert Bosch GmbH, Stuttgart (DE)

(72) Inventor: Christoph-Nikolas Straehle, Ingolstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 10 days.

(21) Appl. No.: 17/368,291

(22) Filed: Jul. 6, 2021

(65) Prior Publication Data

US 2022/0011197 A1 Jan. 13, 2022

(30) Foreign Application Priority Data

Jul. 9, 2020 (DE) .......................... 102020208642.7

(51) Int. Cl.

| | |
|---|---|
| *G06F 11/30* | (2006.01) |
| *G01M 99/00* | (2011.01) |
| *G05B 19/4155* | (2006.01) |
| *G06N 20/00* | (2019.01) |

(52) U.S. Cl.
CPC ....... *G01M 99/005* (2013.01); *G05B 19/4155* (2013.01); *G06N 20/00* (2019.01); *G05B 2219/31368* (2013.01)

(58) Field of Classification Search
CPC .................................................. G01M 99/005
See application file for complete search history.

(56) References Cited

U.S. PATENT DOCUMENTS

| | | | |
|---|---|---|---|
| 5,121,467 A | 6/1992 | Skeirik | |
| 2022/0126864 A1* | 4/2022 | Moustafa | B60W 60/001 |

FOREIGN PATENT DOCUMENTS

| | | | |
|---|---|---|---|
| DE | 102018203280 A1 | 9/2018 | |
| DE | 102019003382 A1 | 11/2019 | |
| DE | 102019208372 A1 | 12/2020 | |
| EP | 2884363 A2 | 6/2015 | |

* cited by examiner

*Primary Examiner* — Phuong Huynh
(74) *Attorney, Agent, or Firm* — Norton Rose Fulbright US LLP; Gerard Messina (57) ABSTRACT

A computer-implemented method for detecting an anomaly in a technical system. The method includes detecting an environment state vector and a system state vector, the environment state vector including at least one first value which characterizes a physical environment condition or a physical operating condition of the technical system, and the system state vector including at least one second value which characterizes a physical condition of the technical system; ascertaining, using an environment anomaly model, an environment value which characterizes a probability or a probability density value with which the environment state vector occurs; ascertaining, using a system anomaly model, a system value which characterizes a conditional probability or a conditional probability density value with which the system state vector occurs if the environment state vector occurs; signaling the presence of an anomaly or signaling the absence of an anomaly based on the environment value and/or the system value.

12 Claims, 9 Drawing Sheets

METHOD AND DEVICE FOR DETECTING ANOMALIES IN TECHNICAL SYSTEMS

CROSS REFERENCE

The present application claims the benefit under 35 U.S.C. § 119 of German Patent Application No. DE 102020208642.7 filed on Jul. 9, 2020, which is expressly incorporated herein by reference in its entirety.

BACKGROUND INFORMATION

German Patent Application No. DE 10 2019 208 372.2 describes a method for monitoring an operating behavior of a technical system and for detecting anomalies in technical systems, so that maintenance, a repair or a replacement of the technical system or of its components may be prompted.

To detect anomalies in technical systems in industrial environments, in general a plurality of descriptive variables (also parameters) are detected which characterize the operating condition of the system. With the aid of a data-based anomaly detection method, the instantaneously detected variables may be used, during ongoing operation, to determine whether the system is operating correctly or whether an anomalous behavior is present.

However, data-based anomaly detection methods have the disadvantage that they may output misevaluations when determining the presence of an anomaly. If an anomaly is erroneously detected, this may result for example in an inadvertent shutdown of the system. It is also possible that an anomaly detection method does not recognize an anomaly as such and the system continues to operate as normal. For example, it is possible that an electric machine is consuming much more power than it would normally. This may result in an inadvertent or even hazardous behavior.

It is therefore vital that an anomaly detection method may provide accurate information about the presence or absence of anomalous behavior of the technical system. In this context, accuracy may be understood to mean the ability of the anomaly detection method to correctly recognize the presence or absence of an anomaly.

An advantage of the method in accordance with the present invention is that the accuracy of an anomaly detection method is increased and therefore a better anomaly detection is possible. This enables a reliable and safe operation of the technical system which is monitored by the anomaly detection method.

SUMMARY

In a first aspect, the present invention relates to a computer-implemented method for detecting an anomaly in a technical system. In accordance with an example embodiment of the present invention, the method includes the following steps:

- detecting an environment state vector and a system state vector, the environment state vector including at least one first value, the first value characterizing a physical environment condition or a physical operating condition of the technical system, and the system state vector including at least one second value, the second value characterizing a physical condition of the technical system;
- ascertaining an environment value with the aid of an environment anomaly model, the environment value characterizing a probability or a probability density value with which the environment state vector occurs;
- ascertaining a system value with the aid of a system anomaly model, the system value characterizing a conditional probability or a conditional probability density value with which the system state vector occurs if the environment state vector occurs;
- signaling the presence of an anomaly or signaling the absence of an anomaly based on the environment value and/or the system value.

In the context of the present invention, a first value may be understood as the result of a measurement of a physical environment condition or a physical operating condition of the technical system. In particular, first values may be measured with the aid of sensors. A first value may characterize for example an air pressure of the environment of the technical system, a humidity of the environment of the technical system, an ambient temperature of the technical system, alpha/beta/gamma/UV/infrared radiation in the environment of the technical system, or an ambient brightness of the technical system.

Furthermore, a second value may be understood as the result of a measurement of a physical condition of the technical system itself. In particular, second values may be measured with the aid of sensors. A second value may characterize for example an operating temperature of the technical system or of at least one part or one component of the technical system, a power consumption of the technical system or of at least one part or one component of the technical system, a speed of the technical system or of at least one part or one component of the technical system, a rotational speed of the technical system or of at least one part or one component of the technical system, a vibration of the technical system or of at least one part or one component of the technical system, or a pressure within the technical system or within at least one part or one component of the technical system.

An environment state vector detected at a point in time and a system state vector detected at the same point in time may be regarded as corresponding.

An environment state vector may be deemed anomalous if an occurrence of the environment state vector with regard to the occurrence of other environment state vectors is improbable. A system state vector may be deemed anomalous if an occurrence of the system state vector with regard to the occurrence of other system state vectors, and taking into account the corresponding environment state vector, is improbable. An anomaly may exactly be present in a technical system if the environment state vector is anomalous and/or the system state vector is anomalous.

The detection of anomalies based on first and second values makes it possible to make the anomaly detection more accurate and to ascertain the cause of an anomaly that has occurred. For this purpose, the anomaly detection method includes an environment anomaly model which is designed to ascertain, for a forwarded environment state vector, a probability or a probability density value in relation to the occurrence of the environment state vector. In this connection, a small probability or a small probability density value may be understood to mean that the environment state vector is improbable and therefore there is probably an anomaly concerning the parameters of the environment. This may occur for example when the technical system is operating in an environment for which it has not been designed or in which it has not been tested.

In addition, in accordance with an example embodiment of the present invention, the anomaly detection method includes a system anomaly model which is designed to ascertain a probability or a probability density value in relation to the occurrence of the system state vector. This model is advantageously designed in such a way that it ascertains the probability or the probability density value in relation to the occurrence of the system state vector as a function of the environment state vector, i.e., to ascertain an involved probability or a conditional probability density value. The advantage lies in the fact that the system anomaly model may evaluate whether the system state vector does or does not represent an anomaly in relation to its environment, and need not decide this only on the basis of the system states alone. Compared to the evaluation of all parameters by a machine learning model, the selected modeling by way of conditional probabilities or probability density values advantageously enriches the method with additional knowledge concerning the relationships between environment parameters and system parameters. This effectuates a higher accuracy of the anomaly detection method.

One example of this is a heating system which is intended to heat a room to a predefined temperature. In this case, it is possible that the heating system reaches the temperature despite minimal energy or no energy being supplied, which may typically be understood as an anomaly. However, it is possible that the room additionally has windows and that the room is already heated almost to the desired temperature by solar radiation. Therefore, in the context of the environment state variable of the solar radiation and the energy associated therewith, reaching the room temperature while minimal energy supply is not an anomaly.

Advantageously, trainable methods from the field of machine learning may be used as the environment anomaly model and/or the system anomaly model, in particular a normalizing flow model as the environment anomaly model and a conditional normalizing flow model as the system anomaly model. An advantage of selecting these two models lies in the fact that environment state vectors and system state vectors may be recorded for example during a test operation or an acclimatization operation of the system, and the environment anomaly model may be trained directly with the detected environment state vectors or the system anomaly model may be trained with the detected environment state vectors and the respectively corresponding system state vectors. The normalizing flow model or conditional normalizing flow model allows that the correspondingly detected data need not first be manually annotated before being able to be used for training, which in turn means that the respective model may be trained with more data in a certain period of time than a monitored trainable model. The resulting increased quantity of training data means that the model in question is trained with more known environment and/or system states, which results in the anomaly detection becoming more accurate.

The example method described above may be understood as a method for monitoring a technical system. In the case that an anomaly has been recognized, the technical system may advantageously be activated in such a way that potentially hazardous or undesirable behavior of the system is minimized or prevented. For example, it is possible that the technical system is able to carry out various actions, and the choice of possible actions is minimized if an anomaly is recognized. One example of this is an at least semi-automated robot, such as an at least semi-automated vehicle. If an anomaly is detected during operation of the vehicle, the vehicle may be prohibited from certain actions that would otherwise be possible, for example prohibited from changing lanes. It is also possible that actions of the technical system will be restricted in their execution. In the example of the vehicle, for example, it is possible that the maximum speed that the vehicle may automatically control is reduced, and the vehicle may thus move only slowly through its surroundings.

It is also possible that, in the step of signaling an anomaly, an anomaly is exactly signaled if the environment value with regard to a predefined first threshold value characterizes an improbable environment state vector and/or if the system value with regard to a predefined second threshold value characterizes an improbable system state vector.

It is possible, for example, that an anomaly concerning the environment will be signaled if the environment value does not exceed the first threshold value. It is alternatively possible that, if the environment value does not exceed the first threshold value, it is ascertained whether there is an anomaly concerning the system itself by comparing the system value with the second predefined threshold value. In this case, an anomaly may be indicated if the system value is below the second threshold value.

It is also possible that the environment anomaly model is retrained with the environment vector if the environment value with regard to the predefined first threshold value characterizes an improbable environment state vector and if the system value with regard to the predefined second threshold value characterizes a probable system state vector.

The case described may be understood as a situation in which, although there is an improbable environment state, the technical system nevertheless continues to operate correctly. This situation may arise in particular if a particular environment for the system has not been taken into account when ascertaining the environment anomaly model, but the system is not negatively affected by this environment. In this case, therefore, the environment anomaly model may be retrained with the updated environment state vector.

An advantage of this procedure lies in the fact that the environment anomaly model may independently automatically improve itself during operation of the system, and thus the anomaly detection accuracy may be further increased.

In a further aspect of the present invention, it is possible that the method for detecting anomalies is carried out by an anomaly detection device, the anomaly detection device including an environment anomaly model and a system anomaly model. In accordance with an example embodiment of the present invention, it is also possible that the training of the anomaly detection device includes the following steps:

ascertaining a plurality of environment state vectors and a plurality of system state vectors, an environment state vector including at least one first value, the first value characterizing a physical environment condition or a physical operating condition of the technical system, and a system state vector including at least one second value, the second value characterizing a physical condition of the technical system;

training the environment anomaly model of the anomaly detection device based on the ascertained plurality of environment state vectors;

training the system anomaly model of the anomaly detection device based on the ascertained plurality of environment state vectors and the respective corresponding system state vectors.

The plurality of environment state vectors and the plurality of system state vectors may be understood as a training data set for the anomaly detection device. To detect these training data, the technical system monitored by the anomaly detection device may be used for example in a test operation or training operation and a plurality of environment state vectors and a plurality of system state vectors may be recorded, which are then made available as a training data set. During operation, it is advantageously ensured that the system is operating correctly.

An advantage of this procedure lies in the fact that, with minimal monitoring of the system (namely ensuring correct functioning during the test operation or training operation), a large amount of training data may be obtained, with which the anomaly detection device may be trained. This results in a high accuracy of the anomaly detection device.

It is also possible that, in the ascertaining step, environment state vectors and/or system state vectors of known anomalous states of the system are also ascertained, and the environment anomaly model and/or the system anomaly model is/are trained in such a way that small probabilities or probability density values are ascertained for these anomalous state vectors. This results in an even more accurate environment anomaly model and/or system anomaly model, which in turn improves the accuracy of the anomaly detection device.

Specific embodiments of the present invention are explained in greater detail below with reference to the figures.

DETAILED DESCRIPTION OF EXAMPLE EMBODIMENTS

Figure 1:
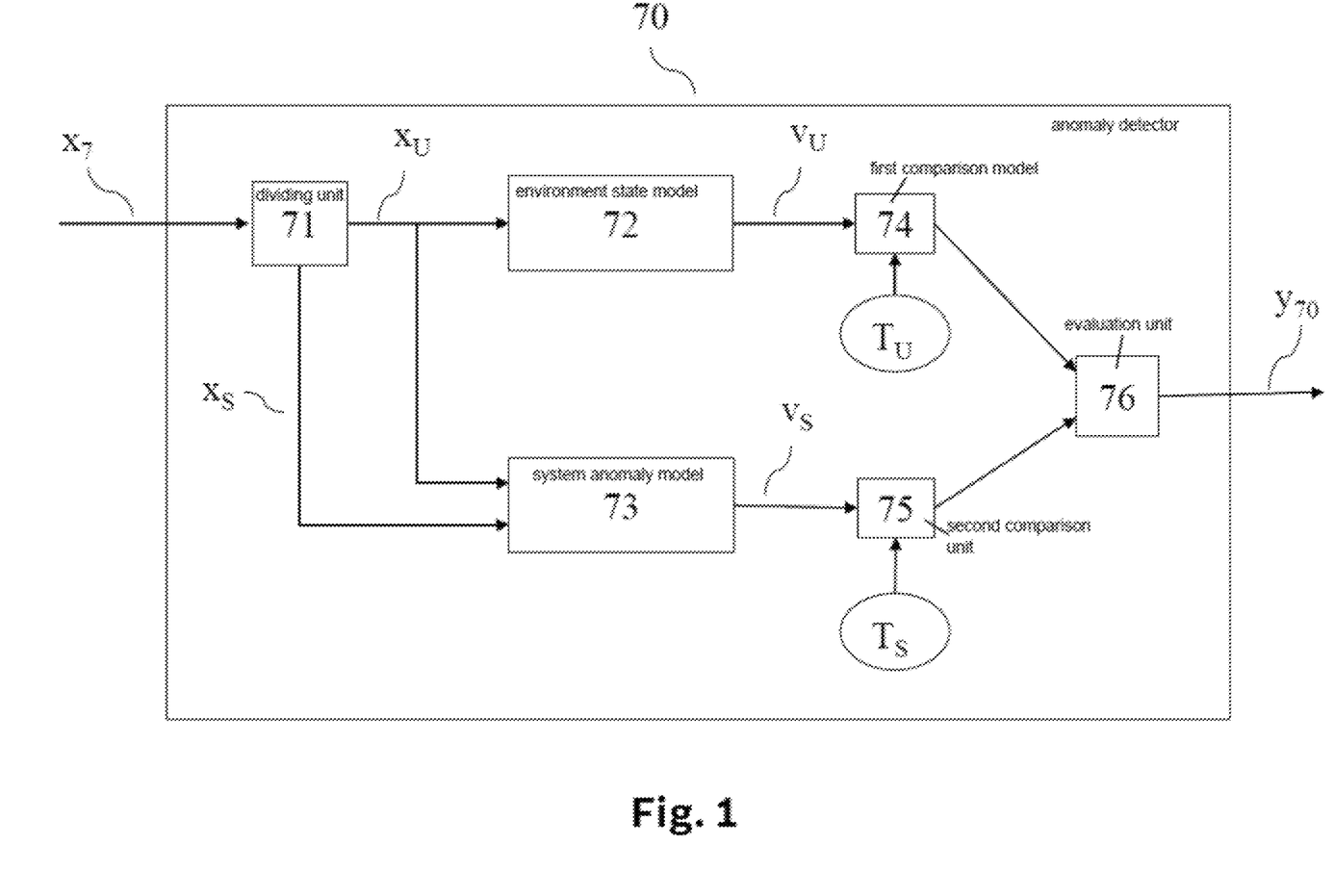
FIG. 1 schematically shows the structure of an anomaly detector in accordance with an example embodiment of the present invention.

FIG. 1 shows an anomaly detector 70. Anomaly detector 70 receives a plurality of first and second values $x_7$), which are divided in a dividing unit 71 into an environment state vector $x_U$ of first values and a system state vector $x_S$ of second values. Environment state vector $x_U$ is fed to an environment anomaly model 72, which is designed to ascertain an environment value $v_U$ that characterizes a probability or a probability density value with which environment state vector $x_U$ occurs. Environment anomaly model 72 is preferably a normalizing flow model.

Furthermore, environment state vector $x_U$ and system state vector $x_S$ are fed to a system anomaly model 73, which is designed to ascertain, for system state vector $x_S$ and as a function of environment state vector $x_U$, a system value $v_S$ that characterizes a conditional probability or a conditional probability density value with which system state vector $x_S$ occurs. System anomaly model 73 is preferably a conditional normalizing flow model.

Environment value $v_U$ is compared in a first comparison unit 74 with an environment threshold value $T_U$. If environment value $v_U$ falls below environment threshold value $T_U$, the presence of an environment anomaly is reported to an evaluation unit 76. In further specific embodiments, it is possible that the presence of an environment anomaly is reported to evaluation unit 76 even if environment threshold value $T_U$ and environment value $v_U$ match.

System value $v_S$ is compared in a second comparison unit 75 with a system threshold value $T_S$. If system value $v_S$ falls below environment threshold value $T_U$, the presence of a system anomaly is reported to evaluation unit 76. In further specific embodiments, it is possible that the presence of a system anomaly is reported to evaluation unit 76 even if system threshold value $T_S$ and system value $v_S$ match.

Evaluation unit 76 then ascertains, based on the presence or absence of an environment anomaly and/or a system anomaly, an anomaly detection output $y_{70}$ which characterizes the presence or the absence.

Figure 2:
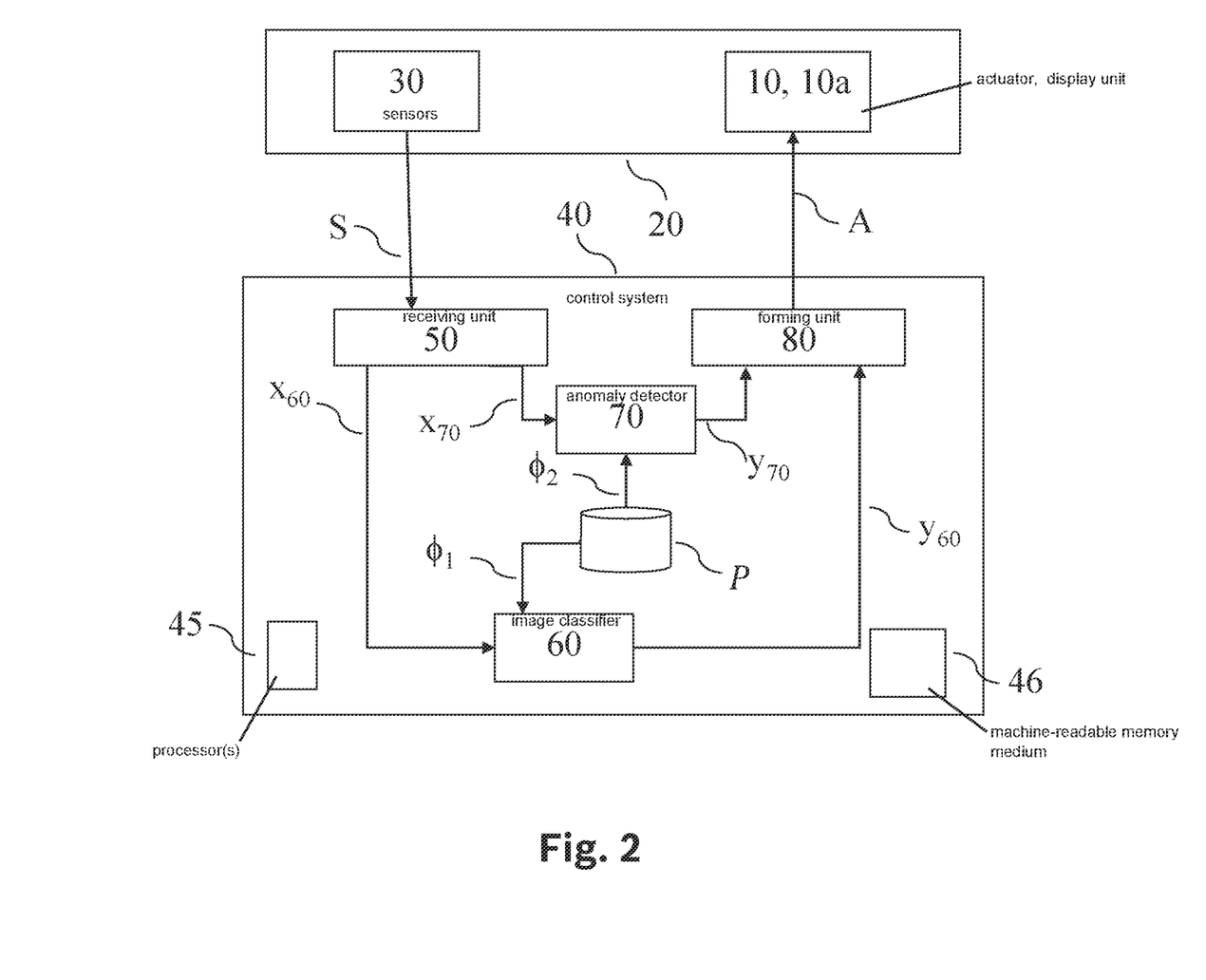
FIG. 2 schematically shows a structure of a control system for activating an actuator, which uses the anomaly detector.

FIG. 2 shows an actuator 10 in its environment 20 in interaction with a control system 40. At preferably regular time intervals, environment 20 is detected in multiple sensors 30. Sensors 30 include sensors by which environment states and system states of control system 40 may be measured. In addition, sensors 30 also include imaging sensors, such as cameras for example. The signals of sensors S are transmitted to control system 40. Control system 40 thus receives a sequence of sensor signals S. From these, control system 40 ascertains activation signals A, which are transmitted to actuator 10.

Control system 40 receives the sequence of sensor signals S from sensors 30 in a receiving unit 50, which converts the sequence of sensor signals S into a sequence of input images $x_{60}$ and a sequence of environment states and system states $x_{70}$. Input image $x_{60}$ may be, for example, a detail or a further processing of a sensor signal from a camera, which is contained in sensor signal S. Input image $x_{60}$ includes individual frames of a video recording. In other words, input image $x_{60}$ and operating states $x_{70}$ are ascertained as a function of sensor signal S. The sequence of input images $x_{60}$ is fed to an image classifier 60. Control system 40 also includes anomaly detector 70, to which the sequence of environment states and system states $x_{70}$ is fed.

Image classifier 60 is preferably parameterized by first parameters $\Phi_1$, which are stored in a parameter memory P and are made available by the latter. Anomaly detector 70 is preferably parameterized by second parameters $\Phi_2$, which are likewise stored in the parameter memory and are made available by the latter.

From input images $x_{60}$, image classifier 60 ascertains output variables $y_{60}$ which characterize a classification of input images $x_{60}$. From operating states $x_{70}$, anomaly detector 70 ascertains an anomaly detection output $y_{70}$ which characterizes whether or not an anomaly is present.

Output variables $y_{60}$ and anomaly detection output $y_{70}$ are fed to a forming unit 80, which from these ascertains activation signals A which are fed to actuator 10 in order to activate actuator 10 accordingly. An output variable $y_{60}$ includes information about objects that may be seen on a corresponding input image $x_{60}$.

Actuator 10 receives activation signals A, is activated accordingly, and carries out a corresponding action. Actuator 10 may in this case include activation logic (not necessarily structurally integrated), which from activation signal A ascertains a second activation signal, with which actuator 10 is then activated.

If an anomaly is present, activation signal A may be selected in such a way that the possible actions of actuator 10 are restricted. If no anomaly is present, it is possible that the possible actions are restricted not on the basis of an anomaly, but rather on the basis of environment 20 of control system 40 that has been ascertained by image classifier 60. It is also possible that, if an anomaly is present, at least some of sensor signals S are transmitted to a manufacturer or operator of control system 40.

In further specific embodiments of the present invention, control system 40 includes sensor 30. In yet further specific embodiments, control system 40 alternatively or additionally also includes actuator 10.

In further preferred specific embodiments, control system 40 includes one or multiple processors 45 and at least one machine-readable memory medium 46, on which instructions are stored which, when executed on processors 45, prompt control system 40 to carry out a method according to the present invention.

In alternative specific embodiments of the present invention, a display unit 10a is provided as an alternative or in addition to actuator 10.

Figure 3:
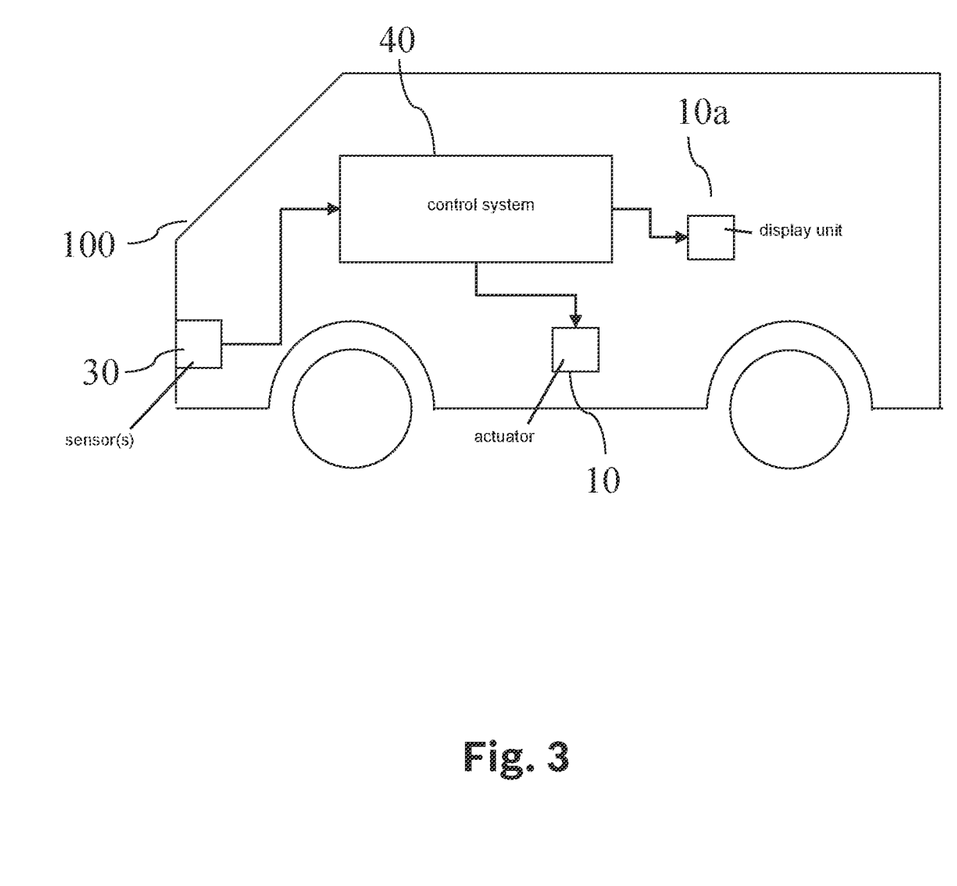
FIG. 3 schematically shows an exemplary embodiment for controlling an at least semi-autonomous robot with the aid of the control system.

FIG. 3 shows how control system 40 may be used to control an at least semi-autonomous robot, here an at least semi-autonomous motor vehicle 100.

Sensors 30 may in this case include, for example, a video sensor, which is preferably situated in motor vehicle 100, as well as sensors for measuring the ambient temperature, sensors for measuring the light intensity, GPS sensors, sensors for measuring the fuel consumption, and/or sensors for measuring the engine speed.

Image classifier 60 is designed to identify objects from input images $x_{60}$.

Actuator 10, which is preferably situated in motor vehicle 100, may be, for example, a brake, a drive or a steering system of motor vehicle 100. Activation signal A may then be ascertained in such a way that the one or multiple actuators 10 is/are activated in such a way that motor vehicle 100 prevents for example a collision with objects identified by image classifier 60, particularly if these are objects of particular classes, for example pedestrians.

In the case that anomaly detector 70 detects an environment anomaly or a system anomaly, activation signal A may be selected in such a way that the vehicle may no longer change lanes and the speed is restricted to a predefined value. Alternatively, it is likewise possible that the control of the vehicle is handed over to a driver or operator (not necessarily located in the vehicle). It is also possible that the anomaly and sensor signals S that have resulted in the anomaly are stored in a fault memory of the control system, and/or a warning message is output on a display device 10a.

Alternatively, the at least semi-autonomous robot may also be a different mobile robot (not shown), for example a robot that moves by flying, swimming, diving or walking. The mobile robot may also be, for example, an at least semi-autonomous lawnmower or an at least semi-autonomous cleaning robot. In these cases, too, activation signal A may be ascertained in such a way that the drive and/or steering of the mobile robot are activated in such a way that the at least semi-autonomous robot prevents for example a collision with objects identified by image classifier 60.

Figure 4:
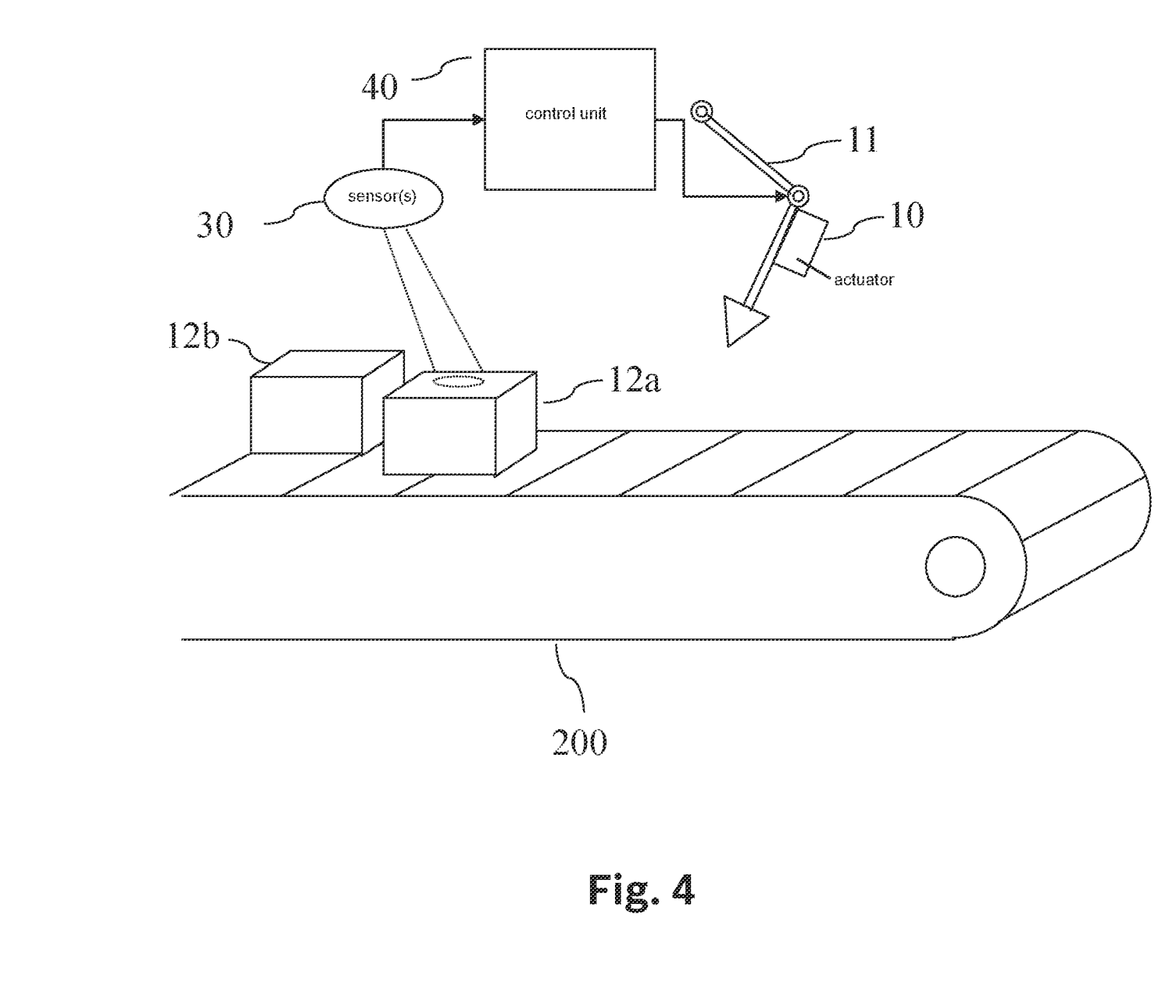
FIG. 4 schematically shows an exemplary embodiment for controlling a manufacturing system with the aid of the control system.

FIG. 4 shows an exemplary embodiment in which control system 40 is used to activate a manufacturing machine 11 of a manufacturing system 200 by activating an actuator 10 which controls this manufacturing machine 11. Manufacturing machine 11 may be, for example, a machine for punching, sawing, drilling and/or cutting.

Sensors 30 may include, for example, an optical sensor which detects for example properties of manufactured products 12a, 12b. The sensors may also include such sensors that may measure the ambient temperature, the air pressure, the light intensity, the radiation, the speed of travel of a conveyor belt and/or the power consumption of manufacturing machine 11.

It is possible that manufactured products 12a, 12b are movable. It is possible that actuator 10 which controls manufacturing machine 11 is activated as a function of an assignment of detected manufactured products 12a, 12b, so that manufacturing machine 11 accordingly executes a subsequent processing step of the correct manufactured product 12a, 12b. It is also possible that, by identifying the correct properties of manufactured products 12a, 12b (i.e., without misclassification), manufacturing machine 11 accordingly adapts the same manufacturing step to process a subsequent manufactured product.

If anomaly detector 70 detects an anomaly, manufacturing machine 11 may be stopped for example, and maintenance may be automatically requested. Alternatively, it is also possible that the presence of an anomaly is indicated to an appropriate technician for closer observation, but the operation of manufacturing machine 11 is maintained.

Figure 5:
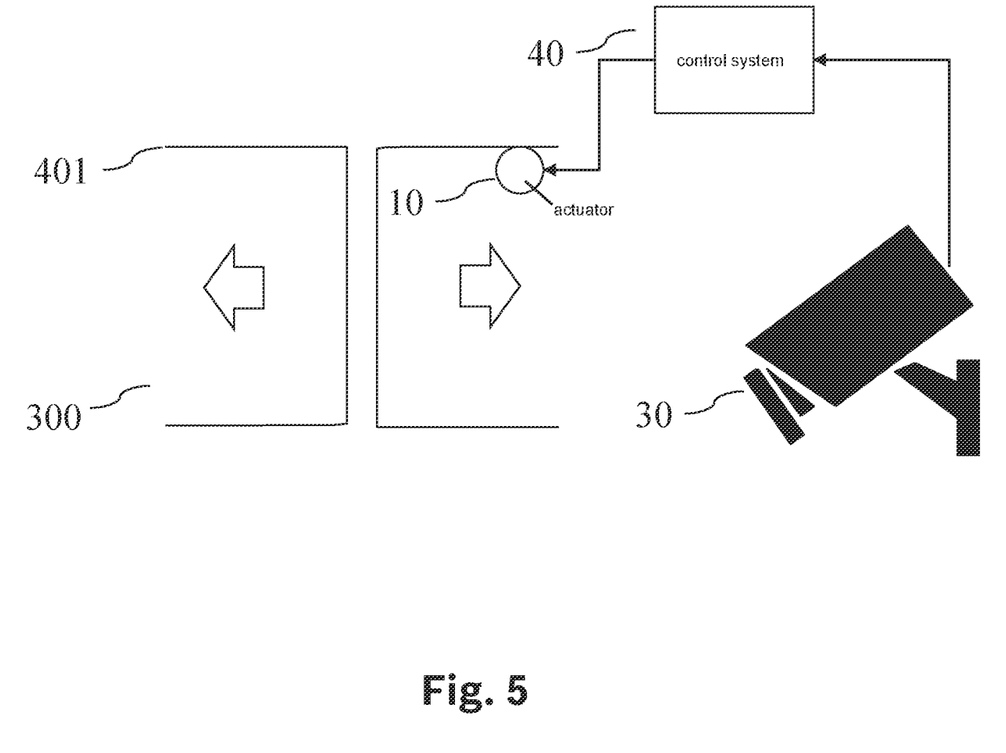
FIG. 5 schematically shows an exemplary embodiment for controlling an access system with the aid of the control system.

FIG. 5 shows an exemplary embodiment in which control system 40 is used to control an access system 300. Access system 300 may include a physical access control, for example a door (401). Sensors 30 may include a video sensor, which is designed to detect a person. Sensors 30 may also include such sensors that may measure an ambient temperature, the light intensity, the time of day, the air pressure and/or the power consumption of actuator 10.

The detected image may be interpreted with the aid of image classifier 60. If multiple persons are detected at the same time, the identity of the persons may be ascertained in a particularly reliable manner by associating the persons (i.e., the objects) with one another, for example by analyzing their movements. Actuator 10 may be a lock which releases the access control, or not, as a function of activation signal A, for example opens door 401 or not. For this purpose, activation signal A may be selected as a function of the interpretation by object identification system (image classifier) 60, for example as a function of the ascertained identity of the person. Instead of the physical access control, a logical access control may also be provided.

For example, if an anomaly is detected, a technician may be contacted automatically in order to check the correct functioning of access system 300.

Figure 6:
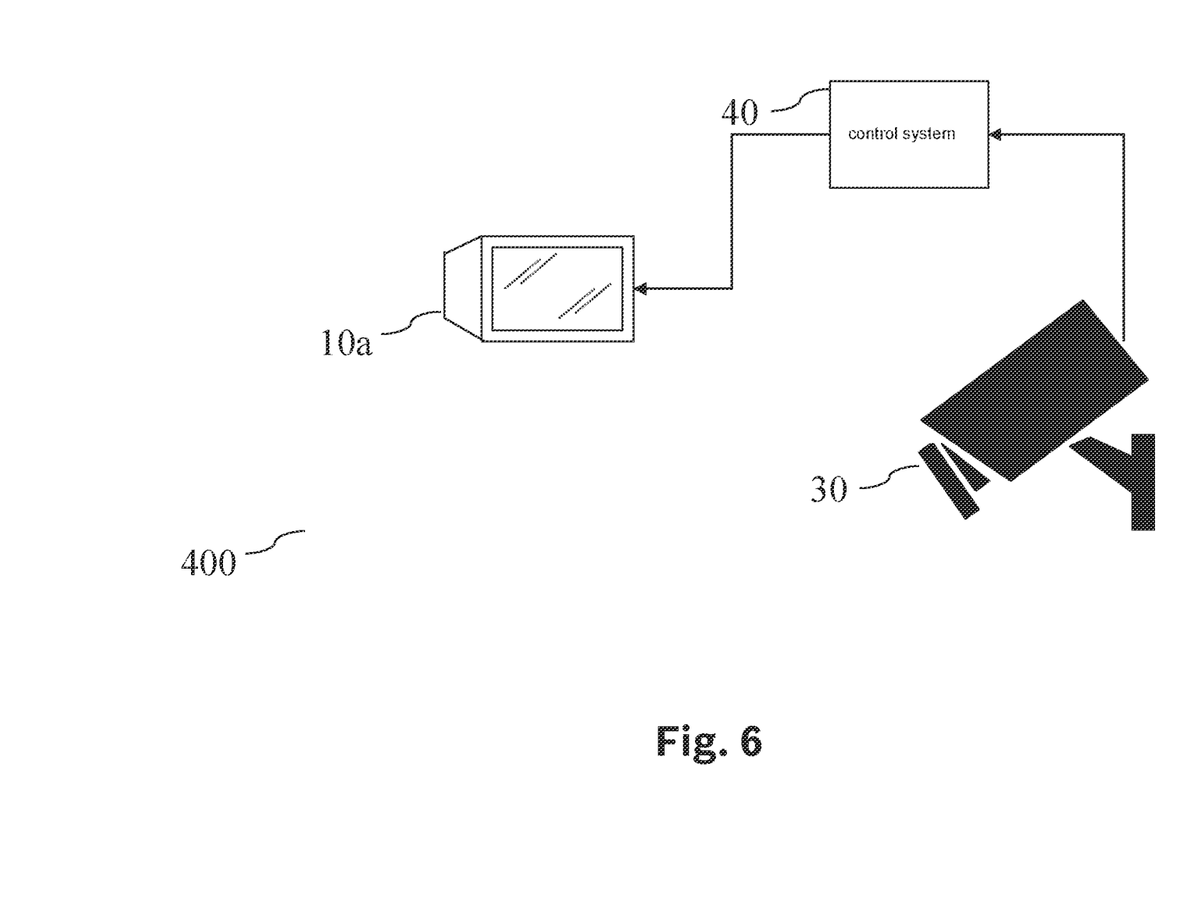
FIG. 6 schematically shows an exemplary embodiment for controlling a monitoring system with the aid of the control system.

FIG. 6 shows an exemplary embodiment in which control system 40 is used to control a monitoring system 400. This exemplary embodiment differs from the exemplary embodiment shown in FIG. 5 in that, instead of actuator 10, display unit 10a is provided, which is activated by control system 40. For example, an identity of the objects recorded by the video sensor may be reliably ascertained by image classifier 60 in order for example, as a function thereof, to deduce those that are suspicious, and activation signal A may then be selected in such a way that this object is displayed by display unit 10a in a manner highlighted in color.

Figure 7:
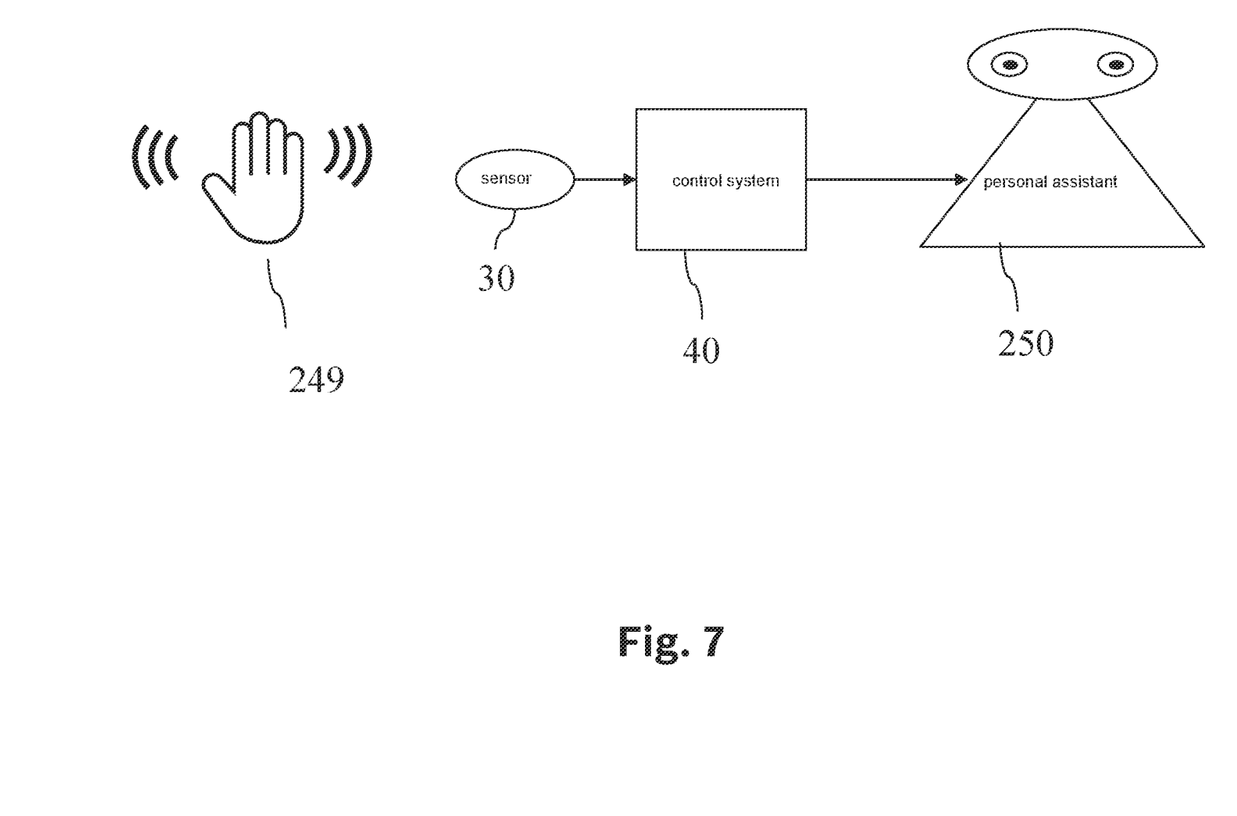
FIG. 7 schematically shows an exemplary embodiment for controlling a personal assistant with the aid of the control system.

FIG. 7 shows an exemplary embodiment in which control system 40 is used to control a personal assistant 250. Sensors 30 preferably include an optical sensor which receives images of a gesture of a user 249.

As a function of the signals of sensor 30, control system 40 ascertains an activation signal A for personal assistant 250, for example as a result of image classifier 60 carrying out gesture recognition. This ascertained activation signal A is then transmitted to personal assistant 250 and thus activates the latter accordingly. This ascertained activation signal A may in particular be selected in such a way that it corresponds to a presumed desired activation by user 249. This presumed desired activation may be ascertained as a function of the gesture recognized by image classifier 60. Control system 40 may then select activation signal A for transmission to personal assistant 250 as a function of the presumed desired actuation and/or may select activation signal A for transmission to the personal assistant according to the presumed desired activation 250.

This corresponding activation may include for example that personal assistant 25 retrieves information from a database and reproduces it for user 249 in a receivable manner.

If a detected anomaly is present, personal assistant (250) may communicate this to user 249 or may automatically inform a technician.

Instead of personal assistant 250, a household appliance (not shown), in particular a washing machine, a stove, an oven, a microwave or a dishwasher, may also be provided so as to be activated accordingly.

Figure 8:
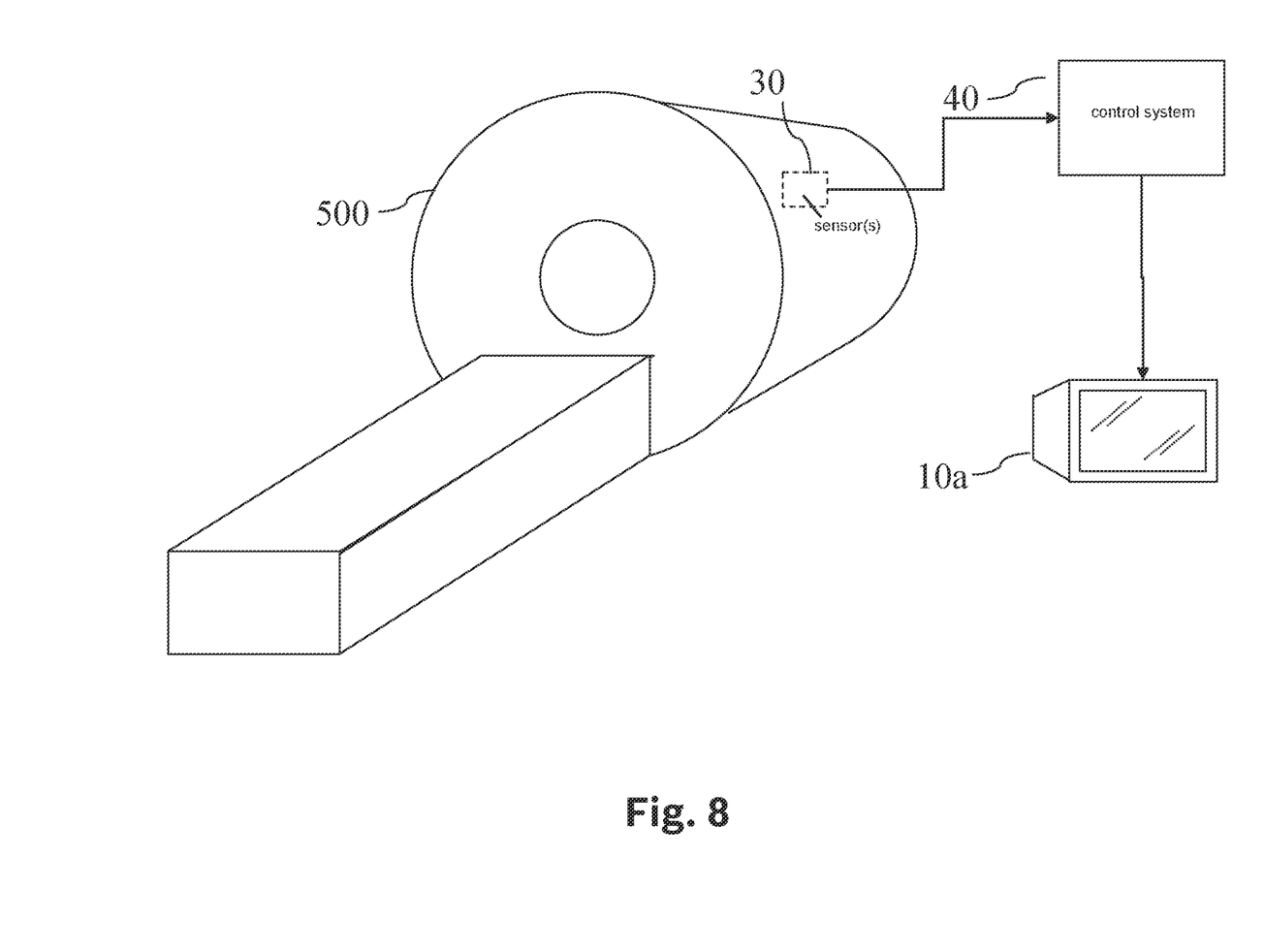
FIG. 8 schematically shows an exemplary embodiment for controlling a medical imaging system with the aid of the control system.

FIG. 8 shows an exemplary embodiment in which control system 40 is used to control a medical imaging system 500, for example an MRI, X-ray or ultrasound machine. Sensors 30 may include, for example, an imaging sensor. Sensors 30 may also include such sensors that may measure the ambient temperature, the humidity, the radiation within imaging system 500, the operating temperature of the imaging system and/or the power consumption of the imaging system.

Display unit 10a is activated by control system 40. For example, image classifier 60 may ascertain whether an area recorded by the imaging sensor is suspicious, and activation signal A may then be selected in such a way that this area is highlighted in color by display unit 10a.

In further exemplary embodiments (not shown), anomaly detector 70 may also monitor a control system which does not use an image classifier 60. Particularly, if the behavior of the control system is determined by a multitude of executable rules, the anomaly detector may monitor the parameters of the environment and of the system itself, as in the exemplary embodiments above.

In the exemplary embodiments shown above, it is also possible that environment anomaly model 72 is retrained with at least environment state vector $x_U$ if evaluation unit 76 is notified of an anomaly concerning environment value $v_U$ but is not notified of an anomaly concerning system value $v_S$. This scenario may be regarded as a situation for which anomaly detector 70 has not been tested, but nevertheless the system functions correctly.

Figure 9:
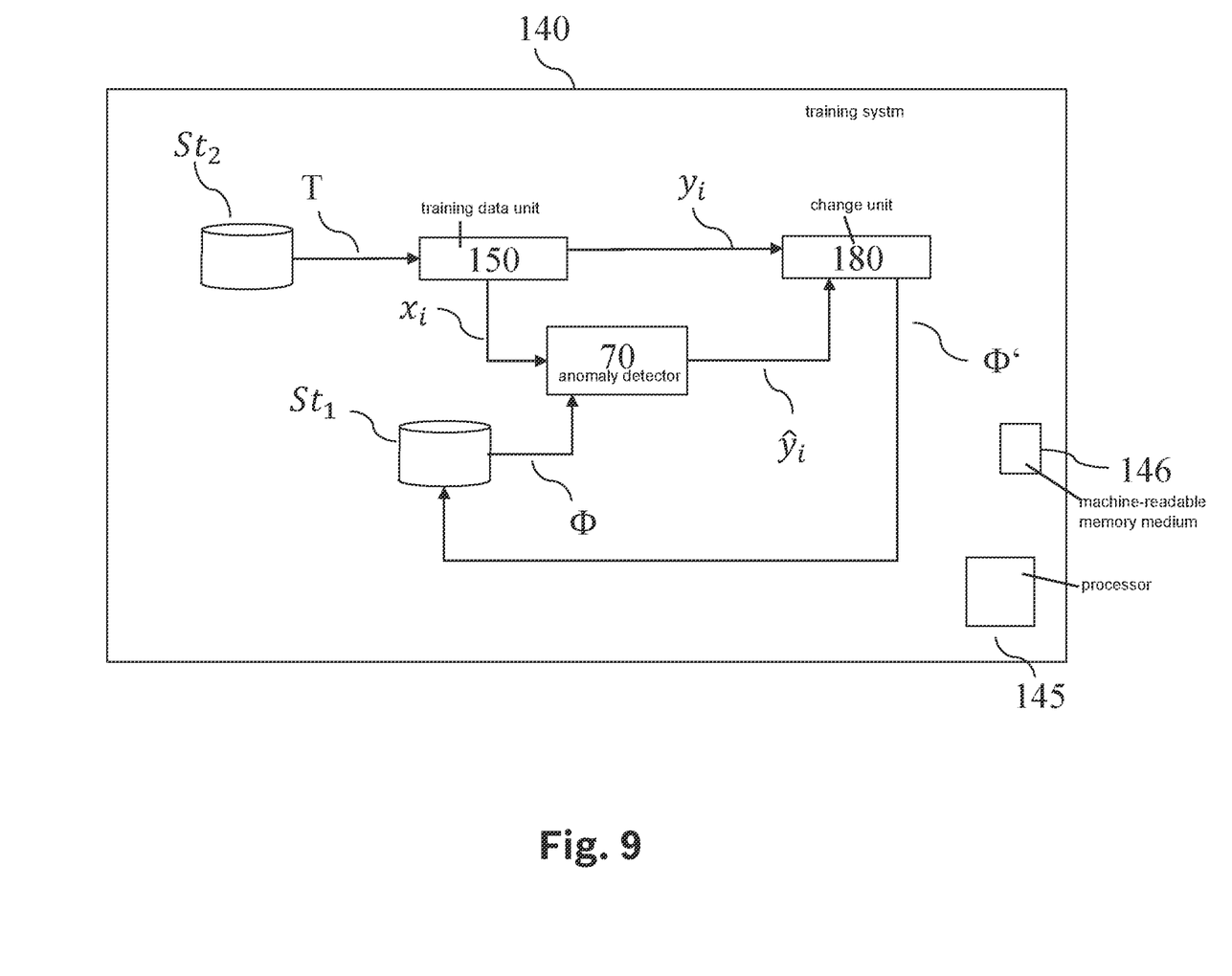
FIG. 9 schematically shows an exemplary embodiment for training an anomaly detector.

FIG. 9 shows an exemplary embodiment of a training system 140 which is designed to train an anomaly detector 70. For the training, a training data unit 150 accesses a computer-implemented database $St_2$, database $St_2$ including at least one training data set T, training data set T including pairs $x_i$ of environment state vectors and system state vectors.

Training data unit 150 ascertains at least one pair $x_i$ of environment state vector and system state vector of training data set T and transmits pair $x_i$ to anomaly detector 70 to be trained. For the environment state vector and the system state vector, anomaly detector 70 determines an environment value with the aid of the environment anomaly model and a system value with the aid of the system anomaly model.

The environment value and the system value are transmitted as an output pair $\hat{y}_i$ to a change unit 180.

Based on ascertained output pair $\hat{y}_i$ and a desired output pair $y_i$ of environment value and system, change unit 180 then determines new model parameters $\Phi'$ for the environment anomaly model and the system anomaly model. It is possible, for example, that both anomaly models are given by neural networks. In this case, change unit 180 may ascertain new model parameters $\Phi'$ with the aid of a gradient descent method, such as Stochastic Gradient Descent or Adam.

Ascertained new model parameters $\Phi'$ are stored in a model parameter memory $St_1$.

Desired output pair $y_i$ may in particular be made up of desired environment value and desired system value, the desired environment value being a desired probability for the environment state vector or a desired probability density value, and the desired system value being a desired probability for the system state vector or a desired probability density value.

In further exemplary embodiments, the training described is repeated iteratively for a predefined number of iteration steps or is repeated iteratively until a difference between ascertained output pair $\hat{y}_i$ and desired output pair $y_i$ falls below a predefined threshold value. In at least one of the iterations, new model parameters $\Phi'$ determined in a previous iteration are used as model parameters $\Phi$ of the anomaly detector.

Training system 140 may also include at least one processor 145 and at least one machine-readable memory medium 146 containing commands which, when executed by processor 145, prompt training system 140 to carry out a training method according to one of the aspects of the present invention.

The term "computer" encompasses arbitrary devices for processing predefinable computing rules. These computing rules may be in the form of software, or in the form of hardware, or else in a mixed form of software and hardware.

What is claimed is:

1. A computer-implemented method for a technical system, comprising the following steps:
   obtaining sensor output;
   generating from the sensor output:
   an environment state vector that includes at least one first value characterizing a physical environment condition of an environment in which the technical system operates; and
   a system state vector that includes at least one second value characterizing a physical condition of the technical system;
   using an environment anomaly model to ascertain as output an environment value based on the environment state vector, which is applied as input to the environment anomaly model, the environment value characterizing a probability or a probability density value of an occurrence of the input environment state vector;
   using a system anomaly model to ascertain as output a system value based on a combination of the environment state vector and the system state vector, which are both applied as input to the system anomaly model, the system value characterizing a conditional probability or a conditional probability density value of an occurrence of the input system state vector when the input environment state vector occurs;

determining whether an anomaly is present based on the environment value and the system value; and controlling the technical system based on a result of the determination.

2. The method as recited in claim 1, wherein the determining of whether the anomaly is present includes comparing the environment value to a predefined first threshold value and comparing the system value to a predefined second threshold value.

3. The method as recited in claim 1, wherein the environment anomaly model is a normalizing flow model and/or the system anomaly model is a conditional normalizing flow model.

4. The method as recited in claim 2, further comprising retraining the environment anomaly model in response to results of the determining of whether the anomaly is present being a predefined inconsistency between results of the comparison to the predefined first threshold value and the comparison to the predefined second threshold value, the predefined inconsistency being that:
 (a) a result of the comparison to the predefined first threshold value is that the environment state vector is anomalous; and
 (b) a result of the comparison to the predefined second threshold value is that the system state vector is not anomalous.

5. The method as recited in claim 1, wherein the controlling includes, when the anomaly is determined to be present, at least temporarily stopping the technical system.

6. A device comprising:
a processor;
a memory storing an environment anomaly model and a system anomaly model;
wherein the processor is configured to:
 obtain sensor output;
 generate from the sensor output:
  an environment state vector that includes at least one first value characterizing a physical environment condition of an environment in which the technical system operates; and
  a system state vector that includes at least one second characterizing a physical condition of the technical system;
 use the environment anomaly model to ascertain as output an environment value based on the environment state vector, which is applied as input to the environment anomaly model, the environment value characterizing a probability or a probability density value of an occurrence of the input environment state vector;
 use the system anomaly model to ascertain as output a system value based on a combination of the environment state vector and the system state vector, which are both applied as input to the system anomaly model, the system value characterizing a conditional probability or a conditional probability density value of an occurrence of the input system state vector when the input environment state vector occurs;
 determine whether an anomaly is present based on the environment value and the system value; and
 control the technical system based on a result of the determination.

7. A method for training an anomaly detection device, the method comprising the following steps:
 ascertaining a plurality of environment state vectors and a plurality of respective corresponding system state vectors, each of the environment state vectors including at least one first value that characterizes a physical environment condition of an environment in which the technical system operates, and each of the respective corresponding system state vectors including at least one second value that characterizes a physical condition of the technical system;
 training an environment anomaly model of the anomaly detection device and a system anomaly model of the anomaly detection device based on the ascertained plurality of environment vectors and the respective corresponding system state vectors;
 wherein the method includes at least one of the following two features (a) and (b):
  (a) the training includes iteratively modifying parameters of at least one of the environmental anomaly model and the system anomaly model, each of one or more of the iterations including:
   obtaining a respective value pair formed of a respective environment value characterizing a probability or a probability density value of an occurrence of one of the environment state vectors and a respective system value characterizing a conditional probability or a conditional probability density value of an occurrence of one the system state vectors when the one of the input environment state vector occurs;
   comparing the obtained respective value pair to an expected value pair; and
   modifying the parameters based on a result of the comparison; and
  (b) the training is performed in response to the anomaly detection device generating a predefined inconsistency, the predefined inconsistency being that one of the environment state vectors is determined by the anomaly detection device to be anomalous and that a corresponding one of the system state vectors is not anomalous.

8. A training device configured to train an anomaly detection device, the training device comprising:
a processor; and
a memory storing an environment anomaly model and a system anomaly model;
wherein:
 the processor is configured to:
  ascertain a plurality of environment state vectors and a plurality of respective corresponding system state vectors, each of the environment state vectors including at least one first value that characterizes a physical environment condition of an environment in which the technical system operates, and each of the respective corresponding system state vectors including at least one second value that characterizes a physical condition of the technical system;
  train the environment anomaly model of the anomaly detection device and the system anomaly model of the anomaly detection device based on the ascertained plurality of environment vectors and the respective corresponding system state vectors; and
 the training device includes at least one of the following two features (a) and (b):
  (a) the training includes iteratively modifying parameters of at least one of the environmental anomaly model and the system anomaly model, each of one or more of the iterations including:

obtaining a respective value pair formed of a respective environment value characterizing a probability or a probability density value of an occurrence of one of the environment state vectors and a respective system value characterizing a conditional probability or a conditional probability density value of an occurrence of one the system state vectors when the one of the input environment state vector occurs;

comparing the obtained respective value pair to an expected value pair; and modifying the parameters based on a result of the comparison; and (b) the training is performed in response to the anomaly detection device generating a predefined inconsistency, the predefined inconsistency being that one of the environment state vectors is determined by the anomaly detection device to be anomalous and that a corresponding one of the system state vectors is not anomalous.

9. A non-transitory machine-readable memory medium on which is stored a computer program for a technical system, the computer program, when executed by a computer, causing the computer to perform the following steps:

obtaining sensor output;

generating from the sensor output:
an environment state vector that includes at least one first value characterizing a physical environment condition of an environment in which of the technical system operates; and
a system state vector that includes at least one second value characterizing a physical condition of the technical system;

using an environment anomaly model to ascertain as output an environment value based on the environment state vector, which is applied as input to the environment anomaly model, the environment value characterizing a probability or a probability density value of an occurrence of the input environment state vector;

using a system anomaly model to ascertain as output a system value based on a combination of the environment state vector and the system state vector, which are both applied as input to the system anomaly model, the system value characterizing a conditional probability or a conditional probability density value of an occurrence of the input system state vector when the input environment state vector occurs;

determining whether an anomaly is present based on the environment value and the system value; and controlling the technical system based on a result of the determination.

10. A non-transitory machine-readable memory medium on which is stored a computer program for training an anomaly detection device, the computer program, when executed by a computer, causing the computer to perform a method, the method including the following steps:

ascertaining a plurality of environment state vectors and a plurality of respective corresponding system state vectors, each of the environment state vectors including at least one first value that characterizes a physical environment condition of an environment in which the technical system operates, and each of the respective corresponding system state vectors including at least one second value that characterizes a physical condition of the technical system;

training an environment anomaly model of the anomaly detection device and a system anomaly model of the anomaly detection device based on the ascertained plurality of environment vectors and the respective corresponding system state vectors;

wherein the method includes at least one of the following two features (a) and (b):

(a) the training includes iteratively modifying parameters of at least one of the environmental anomaly model and the system anomaly model, each of one or more of the iterations including:

obtaining a respective value pair formed of a respective environment value characterizing a probability or a probability density value of an occurrence of one of the environment state vectors and a respective system value characterizing a conditional probability or a conditional probability density value of an occurrence of one the system state vectors when the one of the input environment state vector occurs;

comparing the obtained respective value pair to an expected value pair; and modifying the parameters based on a result of the comparison; and (b) the training is performed in response to the anomaly detection device generating a predefined inconsistency, the predefined inconsistency being that one of the environment state vectors is determined by the anomaly detection device to be anomalous and that a corresponding one of the system state vectors is not anomalous.

11. The training device as recited in claim 8, wherein the training includes the iteratively modifying the parameters of the at least one of the environmental anomaly model and the system anomaly model, the each of one or more of the iterations including:

the obtaining of the respective value pair formed of a respective environment value characterizing a probability or a probability density value of an occurrence of one of the environment state vectors and a respective system value characterizing a conditional probability or a conditional probability density value of an occurrence of one the system state vectors when the one of the input environment state vector occurs;

the comparing of the obtained respective value pair to the expected value pair; and the modifying of the parameters based on the result of the comparison.

12. The training device as recited in claim 8, wherein the training is performed in response to the anomaly detection device generating the predefined inconsistency, the predefined inconsistency being that the one of the environment state vectors is determined by the anomaly detection device to be anomalous and that the corresponding one of the system state vectors is not anomalous.

* * * * *